March 18, 1958 O. MITCHELL 2,827,077
FLOW CONTROL VALVE
Filed Jan. 16, 1956
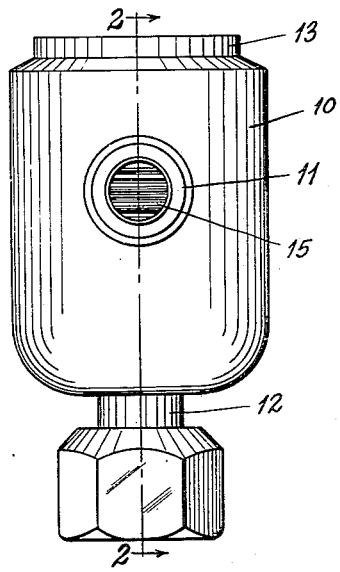
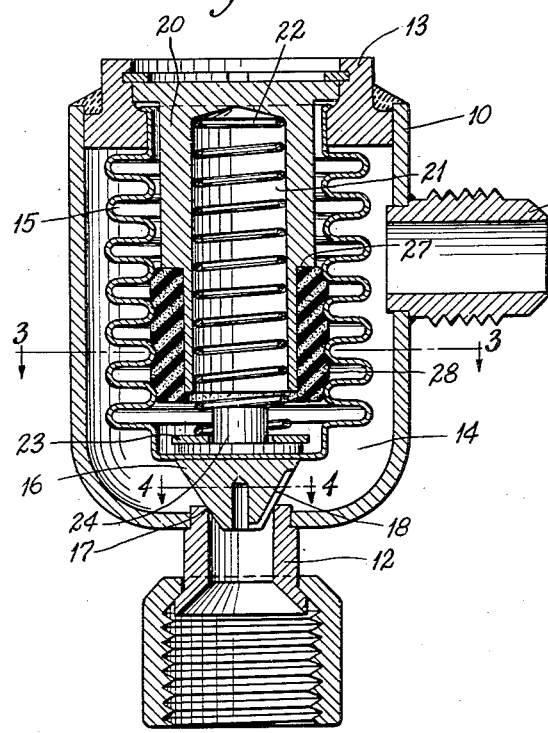
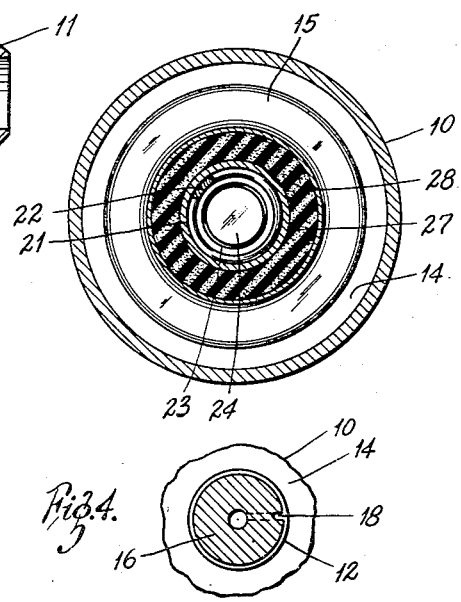
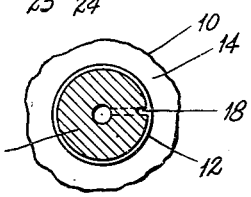
INVENTOR:
ORVILLE MITCHELL,
BY Kingsland, Rogers & Ezell
ATTORNEYS

United States Patent Office 2,827,077
Patented Mar. 18, 1958

2,827,077

FLOW CONTROL VALVE

Orville Mitchell, Dallas, Tex., assignor to John E. Mitchell Company, Dallas, Tex., a corporation of Missouri Application January 16, 1956, Serial No. 559,194

2 Claims. (Cl. 137—510)

The present invention relates to a flow control valve. The particular application of the valve is, as illustrated in the patent application of the applicant and Anderson, Serial No. 512,958, filed February 7, 1955, now Patent No. 2,766,593, to regulate the suction-line flow of refrigerant into the compressor in accordance with the rate of flow and evaporator pressure. The inlet 11, in such case is connected to the evaporator outlet and the outlet 12 is connected to the compressor inlet. However, it will be evident from the description to follow that there are other applications of the invention.

In valves of this type, there is modulation of the valve head or plug with respect to the valve seat. Under certain circumstances, the valve plug may be quite close to the valve seat. Owing to the fact that there may be irregularities of flow, or perhaps for other reasons, a vibration of the valve plug with respect to the seat may be set up, causing an undesirable buzzing noise and causing unexpected wear upon the parts.

The foregoing has proved to be especially true in valves in which the valve plug or head is supported upon a bellows. This is possibly due to the fact that the bellows does not give a rigid support of the valve head against lateral movement. Wear studies have shown that the vibration causing the high pitched noise and the undesirable wear is largely the result of lateral or sidewise movements of the valve plug under conditions of resonance.

The present invention is designed to overcome the foregoing high frequency vibration without interfering with the normal operation of the valve and its supporting diaphragm or bellows. To that end, the invention incorporates the discovery that a type of cushioning to be described hereafter will not interfere with the normal axial cycling of the valve, but will dampen or prevent the lateral vibrations of the valve that cause the noise and wear previously described.

Other objects of the invention will appear from the description to follow.

In the drawings:

Figure 1 is a side elevation of the valve of the present invention;

Figure 2 is a diametrical section through the valve, taken on the line 2—2 of Figure 1;

Figure 3 is a transverse section, taken on the line 3—3 of Figure 2; and

Figure 4 is a section through the valve head, taken on the line 4—4 of Figure 2.

While it will be understood that there may be a number of variations in the specific construction of the valve, the following is a construction wherein the advantages of the present invention are particularly notable.

The valve illustrated includes a valve housing or casing 10 which may be generally cylindrical in shape. It has an inlet 11, an outlet 12, and a top plug or closure 13. The foregoing parts provide for the flow of fluid through the housing 10 and provide a valve chamber 14. The top closure 13 is annular in shape. One end of a bellows 15 is fastened to the closure 13 and extends in the valve chamber 14 toward the outlet 12. The other end of the bellows 15 supports a valve head or plug 16 that is adapted to cooperate with an annular valve seat 17. The valve head 16 is illustrated as tapering and grooved at 18 so that it never closes off tightly, but can permit a limited flow of fluid past it when it is on the valve seat 17 in order that pressures may equalize on opposite sides of the valve. The taper of the valve permits it to modulate flow past the valve seat 17 by moving inwardly and outwardly with respect to the valve seat. Such movement is axial with respect to the bellows 15.

A sleeve 20 is also attached within the annular closure 13 and extends downwardly in the bellows 15. It has a recess 21 extending upwardly from its lower end, which recess is designed to receive and support a coil spring 22 that acts between a washer 23 on the upper end of the valve head 16 and the inner end of the recess 21. The valve head may be provided with a stabilizing boss 24 to center the spring.

The foregoing parts consist of a valve designed as illustrated in the application of Mitchell and Anderson referred to above. However, it was discovered that this valve, when modulating flow of refrigerant between the evaporator and the compressor as functions of rate of fluid flow and evaporator pressure, in the manner set forth in the Mitchell and Anderson application, developed a high-pitched noise under conditions of use. The wear on the valve parts showed that this vibration was the result of lateral movements of the valve head 16 against the valve seat 17, rather than axial movements of those parts. The studies also indicated that the vibrations occurred when the valve was substantially at the pinching point where is was approximately ready to close against the seat. The illustration of the valve is approximately full size and some idea of its operation may be realized when it is noted that the total movement of the valve away from its valve seat to its full open position is about one-eighth of an inch.

The problem aforesaid was serious enough to require considerable study and effort to overcome it. It was finally found that, when a cushion of foam rubber was located at the lower end of the bellows 15 in the manner to be described, the vibration was completely eliminated, at least to the extent of eliminating the noise, and yet the normal axial movement of the valve was not hindered.

To accomplish the foregoing, the sleeve 20 is cut away at 27 and a cylindrical cushion 28 of foam rubber is inserted into the recess 27. The cushion 28 is just large enough to fit between the sleeve 20 and the inner bends of the bellows, as is illustrated.

In use of the valve, the normal modulations, caused by variations of pressure in the valve chamber 14 and variations in flow conditions such as those set forth above occur without interference from the cushion 28. The foam rubber or equivalent has only a very light resistance, and so it is extended over several bends of the bellows. It can, therefore, dampen vibrations without hindering the normal movement of the bellows. In other words, its resistance to the flexing of the individual convolutions of the bellows is very small, but is sufficient to break up the resonance of the lower end of the bellows which caused the noise and wear that are above described.

What is claimed is:

1. A valve comprising a housing having an inlet and an outlet and a valve seat; a valve head movable toward and from the valve seat; a bellows upon one end of which the valve head is mounted and supported, the other end of the bellows being attached to the valve housing, whereby the valve is moved toward and from the valve seat by the expansion and contraction of the bellows, the bellows having its outer surface open to the interior of the valve housing so that pressure within the housing acts upon the outside of the bellows and tends to contract it; a cylindrical device supported on the valve housing and extending downwardly into the bellows, spaced from and out of contact with the inner surfaces of the convolutions of the bellows; a cylindrical cushion of light, flexible, foam-rubber-like material on the end of the device adjacent the valve head, the cushion extending outwardly from the cylindrical device to the inner surfaces of the convolutions of the bellows, and extending axially for the distance of several convolutions of the bellows, to cushion lateral vibrations of the bellows and destroy the conditions of resonance in vibrations of the bellows and the valve head.

2. The valve of claim 1, wherein the device extends downwardly to adjacent the valve head, and the bellows is at least as long as its diameter.

References Cited in the file of this patent

UNITED STATES PATENTS

| | | |
|---|---|---|
| 2,333,401 | Woods | Nov. 2, 1943 |
| 2,392,178 | Paget | Jan. 1, 1946 |